April 8, 1930.　　　V. L. DU BOIS　　　1,754,198
VALVE
Filed March 8, 1929
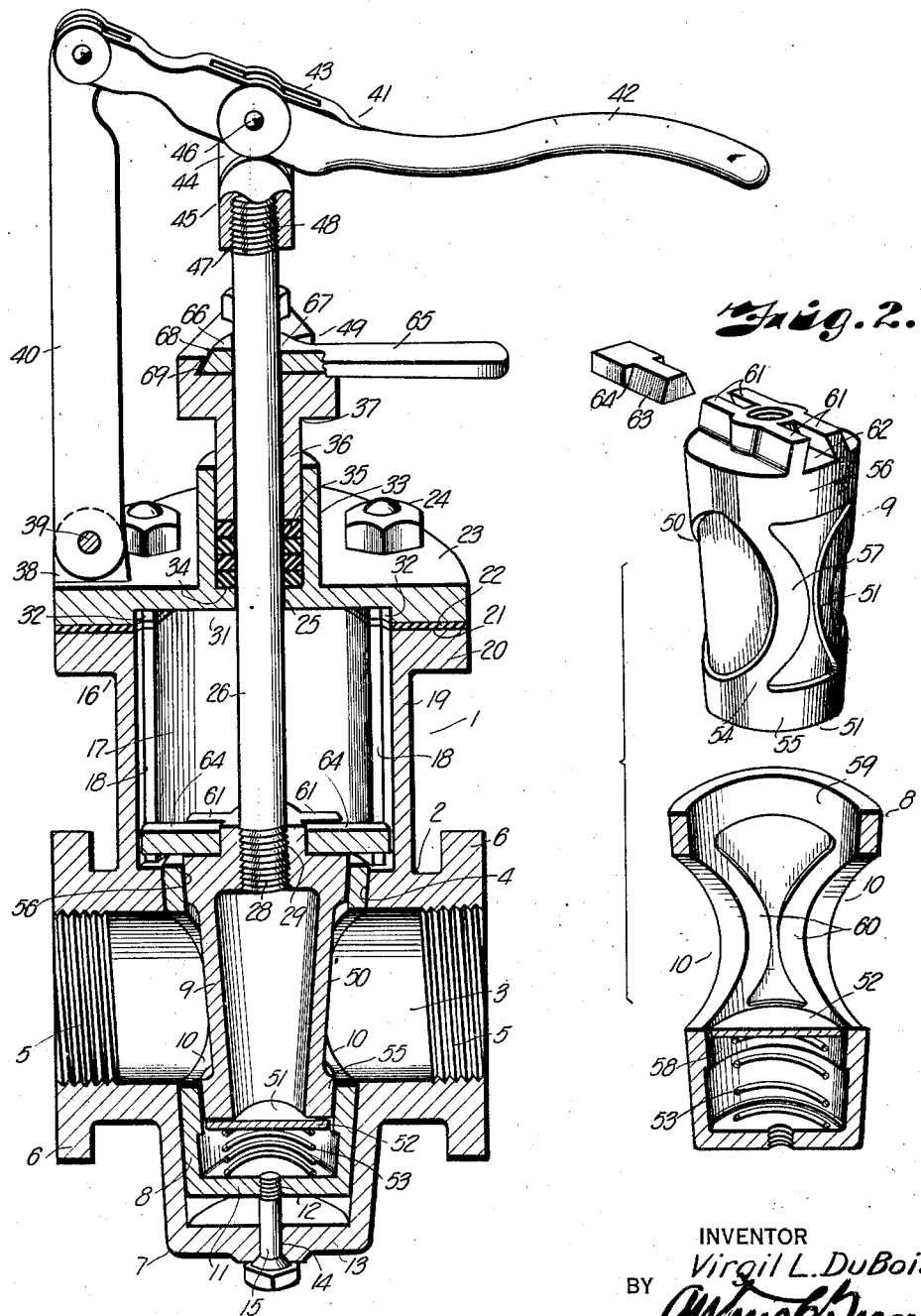
INVENTOR
Virgil L. DuBois
BY
ATTORNEY Patented Apr. 8, 1930

1,754,198

UNITED STATES PATENT OFFICE

VIRGIL L. DU BOIS, OF TULSA, OKLAHOMA, ASSIGNOR TO DU-RA VALVE MANUFACTURING COMPANY, OF TULSA, OKLAHOMA, A CORPORATION OF OKLAHOMA

VALVE

Application filed March 8, 1929. Serial No. 345,318.

My invention relates to gate valves and more particularly to a device of that character for controlling fluid flowing through a flow line, and including a removable valve seat bushing and a cooperating plug member of novel construction, the principal object of the invention being to permit replacement of the valve seat member without removing the valve housing from the flow line.

Another object of the invention is to provide seating surfaces of novel construction on the valve seat bushing and plug for effecting an efficient seal between the members when in closed condition.

A further object of the invention is to provide actuating and retainer mechanism for the valve plug, whereby the plug may easily and quickly be shifted to a desired position relative to the valve seat and locked in selected position by the retainer means.

In accomplishing these and other objects of the invention, I have provided improved details of structure, the preferred forms of which are illustrated in the accompanying drawings, wherein:

Fig. 1 is a central longitudinal section of a valve including my improvements and showing the valve closed.

Fig. 2 is a detail perspective view of my improved valve seat bushing and valve plug.

Referring in detail to the drawings:

1 designates a valve casing including a body portion 2 having a flow channel 3 intersected by a tapered bore 4 and provided with threaded portions 5 opening through end flanges 6 for attachment to sections of a flow line.

Depending centrally from the lower side of the body 2 is a cylindrical reservoir 7, the inner walls thereof forming a continuation of the restricted lower portion of the tapered bore 4 for receiving a tapered valve seat bushing 8 adapted for seating a valve plug 9 and including side ports 10 registering with the flow channel 3, and a bottom end wall 11 provided with a threaded central opening 12. The bottom wall 13 of the reservoir is provided with an opening 14 aligning with the opening 12 in the valve and fitted with a cap screw 15 threadedly engaged in the opening 12 for retaining the bushing in assembled position in the bore.

Formed in the body 2 opposite the reservoir 7 and coaxial with the bore 4 is a cylindrical housing portion 16 having an inside diameter slightly larger than the upper end of the tapered bore 4 to form a chamber 17, and provided with diametrically opposed slots 18 in the side walls 19, said slots extending longitudinally the full length of the housing for purposes hereafter set forth.

Provided at the upper end of the housing 16 is an outwardly protruding annular flange 20 having a flat top face 21 fitted with a gasket 22 for effecting a sealed connection with a closure plate 23 secured to the flange by clamping bolts 24.

The closure plate 23 is provided with a central vertical opening 25 in axial alignment with the housing 16 and slidably engaged by a valve actuating rod 26 extending into the housing and having a threaded lower end 28 engaged in a threaded opening 29 of a boss 30 at the upper end of the valve plug 9.

Formed in the bottom side of the closure plate is a counterbore 31 equal in diameter to the inside diameter of the housing 16 and provided with edge recesses 32 aligning with the longitudinal slots 18 in the housing.

Protruding upwardly from the top side of the closure plate and in concentric relation with the opening 25 is a sleeve portion 33 of greater diameter than the opening 25 to form a shoulder 34 for supporting a packing element 35 which is compressed in the sleeve by the neck portion 36 of a gland member 37 for sealing the rod in operative relation with the closure member.

Located adjacent the edge of the closure plate 23 and protruding upwardly therefrom are paired ears 38 fitted with a hinge pin 39 for pivotally supporting a toggle link 40. The link extends vertically upward from the plate and is pivotally attached to one end of an operating lever 41 whereby opening and closing of the valve may be regulated as hereafter described.

The operating lever includes a handle portion 42 and an intermediate slotted portion 43 for receiving the tongue 44 of a coupling member 45 pivoted therein by a pin 46.

The coupling is provided with a threaded socket 47 engaged by the threaded upper end 48 of the valve actuating rod 26, the rod serving to operably connect the lever 41 with the valve plug 9 and to cooperate with locking mechanism 49 hereafter described.

The valve plug 9 includes a hollow tapered body 50 having an open lower end 51 adapted for engagement by a guard plate 52 which is yieldingly urged upward by a compression spring 53 in the valve bushing 8 and adapted for preventing accumulation of sediment in the bottom of the valve seat.

The body 50 is provided with a seating surface 54 comprising annular raised portions 55 and 56 at opposite ends thereof connected by elliptical raised portions 57. The annular portions 55 and 56 conform with internal annular raised portions 58 and 59 in the valve seat bushing 8, and the elliptical portions 57 conform to elliptical portions 60 bordering the side ports 10, thus providing an effective sealing contact between the plug and bushing for closing the channel 2.

Formed on the upper end of the plug 9 and on opposite sides of the boss 30 are inclined ears 61 forming undercut recesses 62 engaged by the dovetail portion 63 of guide pins 64.

The outer end portion of the guide pins are slidably engaged in the slots 18 of the housing for preventing rotation of the plug 9 and maintaining the seating surface 54 of the plug in alignment with the seating surface of the bushing.

The valve rod locking mechanism comprises a lever 65 having an arcuate head 66 provided with an eccentrically located opening 67 receiving the rod and with a beveled edge 68 rotatably engaging an arcuate undercut recess 69 in the gland member 37.

With a valve constructed as illustrated and described, the seating surface 54 of the valve and the seating surface of the bushing are equal in area thereby insuring an even grinding of the surfaces of each of the members on the grinding operation.

The grinding of the members is completed after their assembly in the valve casing 2 and the bushing 8 may be removed from the casing for regrinding with the plug or for replacement without removing the valve casing from the flow line, thus permitting the continued use of the valve casing with new replacement parts.

In operating the valve for opening, closing, or restricting the channel 2 the plug is adjusted by manipulation of the lever 41 and when adjusted to the desired open or closed position, the locking lever 61 is shifted clockwise causing the rod 26 to be gripped by the edges of the eccentric opening 63 thus retaining the plug in the selected position.

What I claim and desire to secure by Letters Patent is:

1. A valve of the character described, including a housing having a flow channel and a bore intersecting the channel, a bushing in said bore having ports communicating with the flow channel, raised bearing surfaces on the inner face of the bushing surrounding said ports and extending transversely around the bushing at opposite sides of the ports, a valve plug movable in said bushing, having circular and annular raised surfaces on its outer surface corresponding with the raised surfaces on said bushing to provide sealing contacts between the ports over limited and like areas on the respective parts.

2. A valve of the character described, including a housing having a flow channel and a bore intersecting the channel, a bushing removably located in said bore having ports communicating with the flow channel, raised bearing surfaces on the inner face of the bushing surrounding said ports and extending transversely around the bushing at opposite sides of the ports, the transverse bearing surfaces merging with those surrounding the ports, a valve plug movable in said bushing, having circular and annular raised surfaces corresponding with and adapted to seat on the circular and annular raised surfaces on said bushing to provide sealing contacts between the parts over limited and like areas on the respective parts.

In testimony whereof I affix my signature.

VIRGIL L. DU BOIS.